US011427167B2

(12) United States Patent
Breuer et al.

(10) Patent No.: US 11,427,167 B2
(45) Date of Patent: Aug. 30, 2022

(54) METHOD FOR PERFORMING EMERGENCY BRAKING IN A MOTOR VEHICLE AND EMERGENCY BRAKING SYSTEM FOR PERFORMING THE METHOD

(71) Applicant: WABCO Europe BVBA, Brussels (BE)

(72) Inventors: Karsten Breuer, Oberreute (DE); Ruediger Meyer, Hannover (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 223 days.

(21) Appl. No.: 16/092,767

(22) PCT Filed: Apr. 3, 2017

(86) PCT No.: PCT/EP2017/000408
§ 371 (c)(1),
(2) Date: Oct. 11, 2018

(87) PCT Pub. No.: WO2017/220175
PCT Pub. Date: Dec. 28, 2017

(65) Prior Publication Data
US 2019/0118783 A1 Apr. 25, 2019

(30) Foreign Application Priority Data

Jun. 23, 2016 (DE) ...................... 10 2016 007 631.3

(51) Int. Cl.
B60T 7/22 (2006.01)
B60T 8/172 (2006.01)
B60R 21/01 (2006.01)

(52) U.S. Cl.
CPC ............... B60T 7/22 (2013.01); B60R 21/01 (2013.01); B60T 8/172 (2013.01); B60R 2021/01259 (2013.01); B60T 2201/022 (2013.01)

(58) Field of Classification Search
CPC ...... B60T 7/22; B60T 8/172; B60T 2201/022; B60T 7/12; B60T 8/3275; B60T 2201/03;
(Continued)

(56) References Cited

U.S. PATENT DOCUMENTS 4,347,569 A * 8/1982 Allen, Jr. .............. B60T 8/1705
180/197
5,585,798 A 12/1996 Yoshioka et al.
(Continued)

FOREIGN PATENT DOCUMENTS

CN 1608011 A 4/2005
CN 102770316 A 11/2012
(Continued)

Primary Examiner — Nicholas Kiswanto
Assistant Examiner — Jamal A Shah
(74) Attorney, Agent, or Firm — Leydig, Voit & Mayer, Ltd.

(57) ABSTRACT

A method for performing emergency braking in a vehicle includes registering at least one object in surroundings of the vehicle and ascertaining a probability of collision for the vehicle with the at least one registered object to detect an emergency braking situation, autonomously activating service brakes of the vehicle using a vehicle setpoint deceleration to perform emergency braking if an emergency braking situation has been detected, and adapting the vehicle setpoint deceleration during the autonomously performed emergency braking. Adapting the vehicle setpoint deceleration takes place in dependence on at least one driving dynamics parameter. The driving dynamics parameter characterizes a real reaction of the vehicle to the performed emergency braking. The driving dynamics parameter is ascertained during the emergency braking.

14 Claims, 6 Drawing Sheets

(58) Field of Classification Search
CPC ............... B60K 31/0008; B60R 21/01; B60R 2021/01259
See application file for complete search history.

(56) References Cited

U.S. PATENT DOCUMENTS

| | | | |
|---|---|---|---|
| 6,294,987 | B1 | 9/2001 | Matsuda et al. |
| 7,321,819 | B2* | 1/2008 | Seki .................. B60K 31/0008 340/436 |
| 2005/0027402 | A1 | 2/2005 | Koibuchi et al. |
| 2006/0058964 | A1 | 3/2006 | Lucas et al. |
| 2013/0013164 | A1* | 1/2013 | Taguchi ............ B60W 50/0097 701/96 |
| 2013/0018559 | A1 | 1/2013 | Epple et al. |
| 2013/0103280 | A1* | 4/2013 | Roll ....................... B60T 8/172 701/74 |
| 2013/0110368 | A1* | 5/2013 | Zagorski ................... B60T 7/22 701/70 |
| 2017/0174194 | A1 | 6/2017 | Baumgaertner et al. |

FOREIGN PATENT DOCUMENTS

| | | |
|---|---|---|
| DE | 4423966 A1 | 1/1995 |
| DE | 19921238 C2 | 11/1999 |
| DE | 102004028160 A1 | 1/2006 |
| DE | 102004054922 A1 | 6/2006 |
| DE | 102012219188 A1 | 5/2013 |
| DE | 102013205147 A1 | 5/2014 |
| EP | 1625979 A1 | 2/2006 |
| WO | WO 2010012044 A1 | 2/2010 |
| WO | WO 2015113679 A1 | 8/2015 |

\* cited by examiner

METHOD FOR PERFORMING EMERGENCY BRAKING IN A MOTOR VEHICLE AND EMERGENCY BRAKING SYSTEM FOR PERFORMING THE METHOD

CROSS REFERENCE TO RELATED APPLICATIONS

This application is a U.S. National Stage Application under 35 U.S.C. § 371 of International Application No. PCT/EP2017/000408 filed on Apr. 3, 2017, and claims benefit to German Patent Application No. DE 10 2016 007 631.3 filed on Jun. 23, 2016. The International Application was published in German on Dec. 28, 2017, as WO 2017/220175 A1 under PCT Article 21(2).

FIELD

The invention relates to a method for performing emergency braking in a vehicle, in particular a utility vehicle, and an emergency braking system for performing the method.

BACKGROUND

In driving assistance systems, for example automatic emergency braking systems (AEBS) or adaptive cruise control (ACC) systems, surroundings in front of the ego vehicle are scanned using a surroundings monitoring system, in order to be able to detect objects lying ahead in the travel direction, in particular vehicles. The respective driving assistance system reacts in dependence on the detected object with an engagement in the vehicle control, for example in the braking system i.e. braking of the ego vehicle is initiated in dependence on a detected emergency braking situation or a registered distance to a vehicle lying ahead.

The braking action requested by the respective driving assistance system is set in this case such that a collision with the object lying ahead is prevented with high probability and/or the consequences of an accident are minimized with respect to personal harm, wherein in the case of an emergency braking system, a vehicle setpoint deceleration, i.e. a negative acceleration of the vehicle, is firstly set to maximum according to the parameterization of the braking system, in order to ensure a short braking distance of the ego vehicle in an emergency braking situation. In a cruise control system, in contrast, the vehicle setpoint deceleration is adapted to that of the object lying ahead, in order to maintain a uniform distance to the object lying ahead.

According to DE 10 2004 028 160 A1, it is provided that upon detection of an emergency braking situation, the brake force possibly specified by the driver by actuating the brake pedal is automatically elevated to a maximum value, and therefore a maximum vehicle setpoint deceleration can be achieved for the ego vehicle. The driver is thus to be protected in particular in an emergency braking situation against excessively weak actuation of the vehicle brake.

According to DE 199 21 238 C2, it is provided that a vehicle setpoint deceleration is selected in an adaptive cruise control system in dependence on the distance between the ego vehicle and the object lying ahead, wherein the control is classified into three categories. Accordingly, at short distance, full braking is carried out with a very high vehicle setpoint deceleration. At moderate or high distance, the vehicle setpoint deceleration is accordingly selected as gradually lower, in order to adapt the driving behavior of the ego vehicle to that of the object lying ahead. The distance to the vehicle lying ahead can be predictively forecast in this case, for example by detecting a real vehicle actual deceleration of the object lying ahead and approximating it for the future.

U.S. Pat. No. 7,321,819 B2 furthermore discloses an acceleration controller for a vehicle, wherein the vehicle setpoint deceleration is selected in dependence on the distance to the object lying ahead. It is additionally provided in this case that the change of the vehicle setpoint deceleration of the ego vehicle is limited, and therefore if an object lying ahead abruptly brakes, the vehicle setpoint deceleration of the ego vehicle is slowly tracked. The braking comfort is thus to be enhanced. The limiting value for the change of the vehicle setpoint deceleration of the ego vehicle is defined in this case in dependence on the ego vehicle velocity, and therefore at higher vehicle velocities, a greater change of the vehicle setpoint deceleration is permitted and the vehicle can be decelerated more strongly in such a driving situation than at a low vehicle velocity.

DE 10 2004 054 922 A1 furthermore discloses a method for brake force assistance. It is accordingly provided that the brake force or the vehicle setpoint deceleration is regulated in dependence on a probability of collision with the object lying ahead. For this purpose, the braking action carried out by a driver is assisted and if an emergency braking situation is detected, a maximum assistance is set, and therefore the ego vehicle is braked with a maximum vehicle setpoint deceleration. The brake force assistance is set in dependence on the vehicle velocity, and therefore at higher vehicle velocities stronger assistance is accordingly used than at low vehicle velocities. If it is recognized as a result of this assisting braking that a collision could be avoided, i.e. the probability of collision has dropped, the brake force assistance is thus reduced again.

SUMMARY

In an embodiment, the present invention provides a method for performing emergency braking in a vehicle. The method includes registering at least one object in surroundings of the vehicle and ascertaining a probability of collision for the vehicle with the at least one registered object to detect an emergency braking situation, autonomously activating service brakes of the vehicle using a vehicle setpoint deceleration to perform emergency braking if an emergency braking situation has been detected, and adapting the vehicle setpoint deceleration during the autonomously performed emergency braking. Adapting the vehicle setpoint deceleration takes place in dependence on at least one driving dynamics parameter. The driving dynamics parameter characterizes a real reaction of the vehicle to the performed emergency braking. The driving dynamics parameter is ascertained during the emergency braking.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
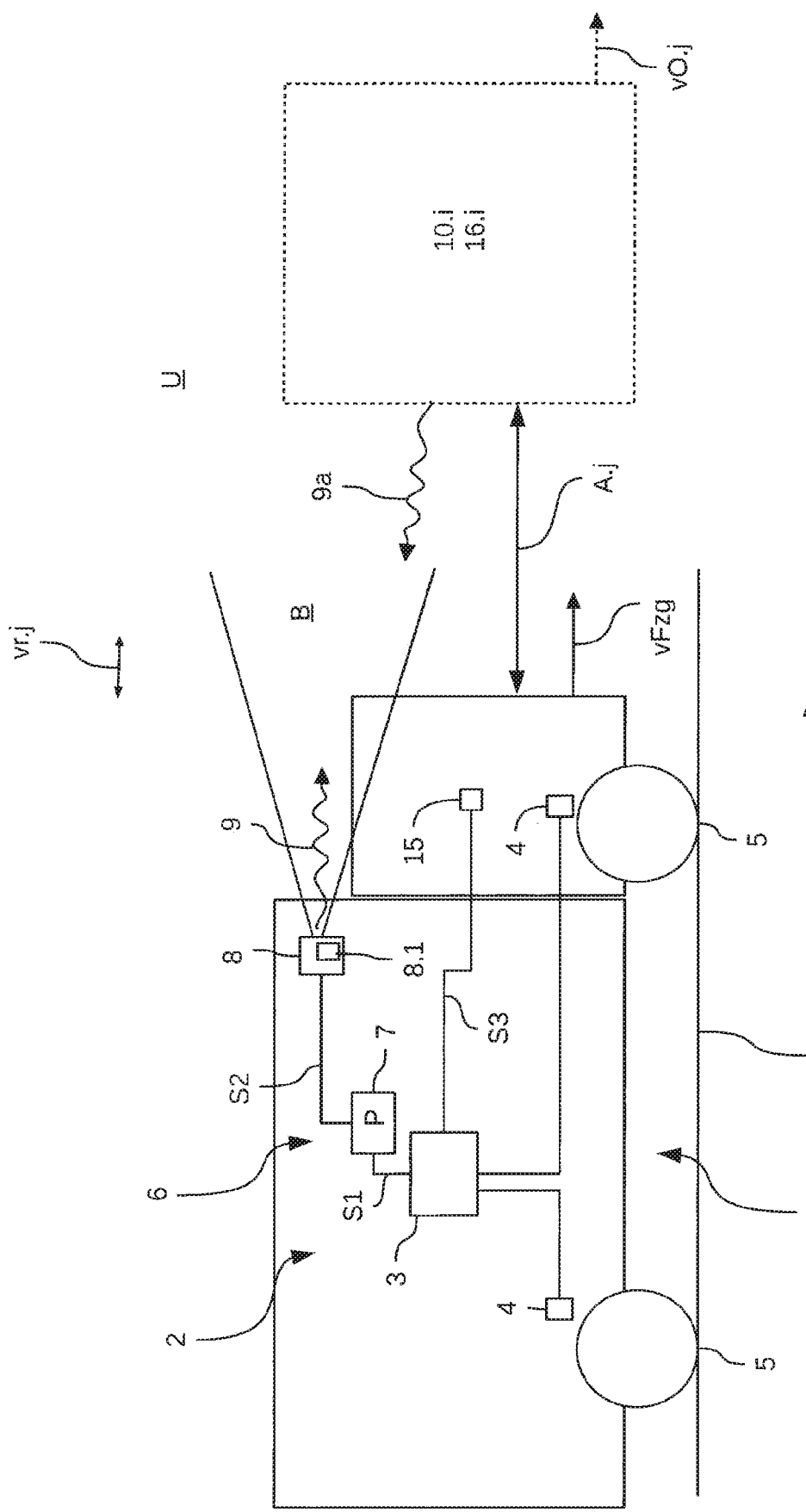
FIG. 1 shows a utility vehicle having an emergency braking system.

The prior art has the disadvantage that the vehicle setpoint deceleration specified during autonomously performed braking is set in dependence on values parameterized in the braking system of the vehicle. In this case, the braking system of a certain vehicle type is adapted in particular with respect to the "functional safety" according to ISO norm ISO 26262 such that the ISO norm can be complied with during autonomously performed emergency braking. The parameterization is defined in this case, for example, by considering the braking behavior for a vehicle of this vehicle type which brakes very well. However, if a deviation results in the braking behavior, for example as a result of a variation in the loading of the vehicle, a malfunction of the braking system, or appearances of wear of the brakes of the braking system, or also as a result of a weaker design of the braking system for an individual vehicle within the vehicle type, the previously defined parameterization is thus no longer accurate. The previously defined parameterization can therefore result in non-optimum braking behavior during emergency braking for this individual vehicle, wherein, for example, an excessively long or excessively short braking distance can result in an emergency braking situation; the vehicle safety for the ego vehicle and the following vehicle drops with respect to ISO 26262 in case of collision.

Embodiments of the invention provide methods for performing emergency braking in a vehicle, using which emergency braking adapted to the braking system of the vehicle can be performed safely and reliably and while complying with specified norms. Embodiments of the invention further provide emergency braking systems for performing such a method.

According to embodiments of the invention, a vehicle setpoint deceleration of the ego vehicle is adapted during emergency braking in dependence on at least one driving dynamics parameter, which specifies an actual braking behavior of the ego vehicle and/or an actual reaction of the vehicle to the initiated emergency braking, i.e. adaptive control of the vehicle setpoint deceleration takes place, which is oriented according to the at least one driving dynamics parameter. The at least one driving dynamics parameter is continuously determined for this purpose during autonomously initiated emergency braking, wherein the driving dynamics parameter characterizes a development of an ego vehicle velocity over time during the emergency braking and accordingly results from the vehicle velocity preferably ascertained directly in the vehicle during emergency braking.

The emergency braking can thus advantageously be performed on the basis of actually existing driving dynamics or braking dynamics, i.e. the actual reaction of the vehicle to the initiated emergency braking. Since reference is not made in this regard to a previously performed fixed parameterization of the braking system, even in the event of an impairment of the braking performance, for example as a result of wear of the brakes, a change of the loading, or also a malfunction of the braking system, optimum braking behavior adapted to the present vehicle dynamics with minimized braking distances can be set from the presently existing values. The emergency braking can thus furthermore be adapted simply and reliably to the braking system of the respective vehicle, and therefore optimum braking behavior with minimized braking distances can be achieved even in the case of identical vehicle types having differently designed braking systems, for example with regard to the brake force.

The vehicle setpoint deceleration during the emergency braking is therefore not controlled in dependence on a probability of collision possibly reduced by the initiated emergency braking, but rather in dependence on the actual driving dynamics reaction of the ego vehicle to the initiated emergency braking.

In particular, the vehicle setpoint deceleration is only adapted in dependence on the at least one driving dynamics parameter if the at least one driving dynamics parameter does not comply with a driving dynamics limiting value, i.e. exceeds it or falls below it. The respective driving dynamics limiting value is defined in this case legally or in dependence on a norm, and therefore the braking system can advantageously be adapted during autonomously executed emergency braking to the really existing braking behavior of the ego vehicle in consideration of the relevant norms and laws. For this purpose, the respective driving dynamics parameter is continuously monitored in particular during emergency braking and if the driving dynamics limiting value is not complied with, this causes a reaction of an adaptation of the vehicle setpoint deceleration until the driving dynamics limiting value is complied with again.

A driving dynamics parameter is preferably understood according to a first embodiment as a mean vehicle full deceleration, which is defined according to ECE R13 Annex 4 as a mean value of a really existing vehicle actual deceleration observed over a period of time or a distance covered during the emergency braking. According to ISO norm ISO 26262, a full deceleration limiting value is defined as the driving dynamics limiting value for the vehicle full deceleration, wherein the full deceleration limiting value results in that a risk for a collision accident or a hazard to a following vehicle is to be minimized in the scope of the "functional safety" according to ISO 26262. It is accordingly provided that the really existing vehicle actual deceleration and therefore also the vehicle full deceleration are limited such that the following vehicle can react adequately without causing a severe collision accident with personal harm at the same time.

In order to check whether the ego vehicle complies with the driving dynamics limiting value—i.e. the full deceleration limiting value—during initiated emergency braking, the vehicle full deceleration is continuously ascertained after initiated emergency braking and if the full deceleration limiting value is exceeded, the vehicle setpoint deceleration which was requested by the braking system as a result of a recognized emergency braking situation is continuously reduced to maintain the full deceleration limiting value again. This is because the vehicle actual deceleration and the mean value of the vehicle actual deceleration, i.e. the mean vehicle full deceleration, also change as a result of the adaptation of the requested vehicle setpoint deceleration.

During the adaptation of the vehicle setpoint deceleration to the really existing braking behavior, a legally prescribed setpoint deceleration limiting value is preferably also taken into consideration, which specifies that the vehicle setpoint deceleration during emergency braking cannot sink below 4 $m/s^2$. If the full deceleration limiting value is exceeded by the mean vehicle full deceleration and subsequent adaptation of the vehicle setpoint deceleration, it is therefore not regulated to below the setpoint deceleration limiting value, but rather in this case kept at the setpoint deceleration limiting value until the mean vehicle full deceleration is in a range which permits raising the vehicle setpoint deceleration above the setpoint deceleration limiting value again.

Therefore, control of the braking system according to norms can take place during emergency braking, without having to make use of a previously performed parameterization in this case, which applies for a specific vehicle type but is not adapted with respect to the braking performance, i.e. in particular the brake force, of differently designed braking systems within a vehicle type, and also other impairments of the braking system. The optimum braking behavior during emergency braking with minimized braking distances therefore also results for different embodiments of the braking system within a vehicle type.

According to a further embodiment, additionally or alternatively to the first embodiment, it is provided that a vehicle velocity change is considered as the driving dynamics parameter. I.e. the vehicle setpoint deceleration is additionally or alternatively set in an emergency braking situation in dependence on a vehicle velocity change. It is accordingly continuously ascertained after initiated autonomous emergency braking how the vehicle velocity of the ego vehicle changes over time from a starting velocity at the beginning of braking. If a previously defined change limiting value is exceeded as a further driving dynamics limiting value, the emergency braking is thus terminated, i.e. the vehicle setpoint deceleration is set to zero.

The previously defined change limiting value of the vehicle velocity can correspond in this case, for example, to the legally prescribed minimum value for emergency braking of 20 km/h, i.e. the ego vehicle is decelerated after initiating the emergency braking by the legally required 20 km/h and the emergency braking is subsequently terminated. However, higher values can also be set for the change limiting value.

The defined minimum value or change limiting value follows in this case, on the one hand, from observations from the viewpoint of the following traffic, wherein in dependence on an assumed safety distance and an assumed reaction time of the following traffic, this traffic will only expect a limited velocity reduction of the vehicle traveling ahead. If the vehicle traveling ahead reduces the vehicle velocity excessively fast, a collision will occur with the following traffic. On the other hand, however, the vehicle velocity of the ego vehicle, for which a high probability of collision was ascertained, is to be reduced simultaneously within a short time, in order to avoid a collision and an incorrect decision. This is taken into consideration by the legally defined minimum value.

It is thus advantageously possible that, for example, the legally required minimum value and/or the corresponding defined change limiting value can also be reliably complied with and the latter is/are not set, as in conventional braking systems, via a braking duration derived from the previously performed parameterization of the braking system. If the previously performed parameterization does not correspond in the case to the real braking behavior, the vehicle will not be braked by the defined change limiting value over the theoretically ascertained braking duration but rather by a higher or a lower value. It is thus advantageously possible to avoid an emergency braking situation incorrectly being terminated excessively early or excessively late and thus the risk and the hazard to the following traffic not being minimized according to ISO 26262 and the legal requirement not being complied with.

The two driving dynamics limiting values are therefore defined in dependence on a risk analysis and a hazard estimation according to ISO 26262 for the ego vehicle.

Preferably, at the beginning of braking, i.e. after an imminent collision or an excessively high probability of collision has been registered by an emergency braking system in the ego vehicle, firstly a maximum vehicle setpoint deceleration is requested by the braking system of the vehicle, and therefore a braking distance can be minimized in the context of the emergency braking situation. The maximum vehicle setpoint deceleration is oriented in this case according to the braking performance of the respective braking system, in particular the maximum settable brake force for the respective vehicle. If the driving dynamics limiting values are no longer maintained from a certain point in time, the vehicle setpoint deceleration is reduced accordingly.

To achieve a soft control of the vehicle setpoint deceleration, a predicted behavior of the driving dynamics parameters can be considered, for example by calculating from when the driving dynamics parameter will no longer comply with the driving dynamics limiting values. It is accordingly also possible to react even before exceeding, for example like a PID (proportional-integral-differential) controller. The driving behavior can thus be calmed, and therefore abrupt braking is not perceived by the driver, which can result in a panic reaction or in further instability of the vehicle. Furthermore, due to slow adaptation of the vehicle setpoint deceleration, it is possible for no brake slip cases to occur during the emergency braking, which unnecessarily lengthens the braking distance and influences the stability of the vehicle.

An emergency braking situation is advantageously registered by an emergency braking system in the vehicle, which receives emergency braking signals from a surroundings monitoring system, which has, for example, a radar sensor or a LIDAR sensor. For this purpose, electromagnetic radiation is emitted by the surroundings monitoring system in the travel direction of the vehicle and electromagnetic radiation which has been reflected by the objects in the surroundings is detected by the radar sensor or by the LIDAR sensor, respectively. The surroundings monitoring system preferably emits the electromagnetic radiation in this case in an angle range, and therefore multiple objects can also be registered simultaneously, which are possibly also located on an adjacent lane or adjacent to or above the roadway. The surroundings monitoring system can be integrated in this case in the emergency braking system or the emergency braking system makes use of existing surroundings monitoring systems in the ego vehicle.

On the basis of the reflected electromagnetic radiation, the emergency braking system can, for example in the emergency braking control unit, in particular conclude a spacing, a relative velocity, and an angle with respect to the respective detected object and, for example, assign an identification to each detected object, and therefore the object can be observed unambiguously over time using the respective identification. A relative movement between the ego vehicle and the detected object and, depending thereon, for example, the predicted movement paths or also the object velocities can thus be ascertained, which are used to evaluate a probability of collision and thus to detect an emergency braking situation.

Advantageously, no hardware adaptations are therefore necessary, since a surroundings monitoring system having the corresponding sensors are a part of a conventional vehicle, in particular a utility vehicle, in any case and therefore at most an adaptation of the software in the emergency braking system or in the braking system of the vehicle is necessary to be able to execute methods according to embodiments the invention. The installation effort and the cost expenditure can thus be minimized.

A vehicle 1, in particular a utility vehicle, is illustrated in FIG. 1, which has a braking system 2, in particular an electrically controlled pneumatic, electrical, or hydraulic braking system. Service brakes 4 are provided in the braking system 2, which, controlled by a braking control unit 3, can brake the wheels 5 of the vehicle 1 to decelerate the vehicle 1. Furthermore, an emergency braking system 6 having an emergency braking control unit 7 is provided as part of the braking system 2, wherein the emergency braking control unit 7 is connected to the braking control unit 3 as an external emergency braking control unit 7 according to this exemplary embodiment and can exchange emergency braking signals S1.

The emergency braking control unit 7 is designed to effectuate emergency braking in dependence on a probability of collision P, by outputting a corresponding emergency braking signal S1 to the braking control unit 3 upon detection of an imminent emergency braking situation, which control unit thereupon effectuates braking, and therefore the vehicle 1 is braked. The emergency braking is effectuated autonomously in this case, i.e. without the driver having to engage. In addition, in dependence on the emergency braking signal S1 output by the emergency braking control unit 7, a warning signal S3 is output to a warning unit 15, in order to warn the driver of the vehicle 1 beforehand of an imminent emergency braking situation. The driver can then possibly also effectuate braking of the vehicle 1 and/or initiate steering themselves.

To detect the emergency braking situation in dependence on the probability of collision P, the emergency braking control unit 7 records sensor signals S2 of a surroundings monitoring system 8 and processes them. The surroundings monitoring system 8 has, according to this embodiment, a sensor 8.1, for example a radar sensor or a LIDAR sensor, and emits electromagnetic radiation 9 into surroundings U located in front of the vehicle 1 and/or in a travel direction F, wherein the electromagnetic radiation 9 is emitted in an angle range B, and therefore the surroundings U can be monitored in an angle range B.

The electromagnetic radiation 9 is reflected on moving objects 16.i, i=1, 2, 3 (moving objects) and also on stationary objects 10.i, i=1, 2, 3 (stationary objects) in front of the vehicle 1 such that a part of the electromagnetic radiation 9a reflected by the objects 10.i, 16.i is reflected back to the surroundings monitoring system 8. The surroundings monitoring system 8 detects this part of the reflected electromagnetic radiation 9a and analyzes it, for example by a comparison of the emitted electromagnetic radiation 9 in the angle range B with the reflected electromagnetic radiation 9a. In particular, a spacing A.j to the respective object 10.i, 16.i, an angle ☐.j in relation to the respective object 10.i, 16.i with respect to the travel direction F of the vehicle 1, and, from a Doppler effect measurement, a relative velocity vr.j of the respective object 10.i, 16.i relative to the ego vehicle 1 can be concluded from the analysis. A corresponding object velocity vO.j of the respective object 10.i, 16.i can be derived from the relative velocity vr.j to the respective object 10.i, 16.i via a vehicle velocity vFzg of the ego vehicle 1.

The index "i" and the index "j" extend in this case over different value ranges, wherein the spacing A.j, the angle ☐.j, the relative velocity vr.j, and the object velocity vO.j are each in relation to one of the objects 10.i, 16.i, i.e. the spacing A.1 indicates the spacing to the stationary object 10.1, . . . , and the spacing A.4 indicates the spacing to the moving object 16.1 etc. I.e. "j" extends from 1 to 6 according to this exemplary embodiment (three moving objects and three stationary objects).

Therefore, the surroundings U can be scanned in the angle range B in front of the vehicle 1 via the electromagnetic radiation 9 by the surroundings monitoring system 8 and the spacing A.j, the angle ☐.j, and the relative velocity vr.j can be determined for each detected object 10.i, 16.i and stored, associated with the respective object 10.i, 16.i, in the emergency braking control unit 7. These items of information A.j, ☐.j, vr.j can be stored for the respective object 10.i, 16.i, and therefore the movement of the respective object 10.i, 16.i can be observed over time in a simple manner.

Using these items of information A.j, ☐j, vr.j on the individually registered objects 10.i, 16.i, the emergency braking control unit 7 can compute a probability of collision P for the ego vehicle 1 with the respective detected object 10.i, 16.i and decide whether an emergency braking situation exists. To calculate the probability of collision P, for example, it is taken into consideration whether the ego vehicle 1 having the present relative velocity vr.j and the present spacing A.j can still brake in a timely manner, without a collision with personal harm occurring with the respective object 10.i, 16.i. This check is performed for every detected object 10.i, 16.i in the angle range B.

Figure 2:
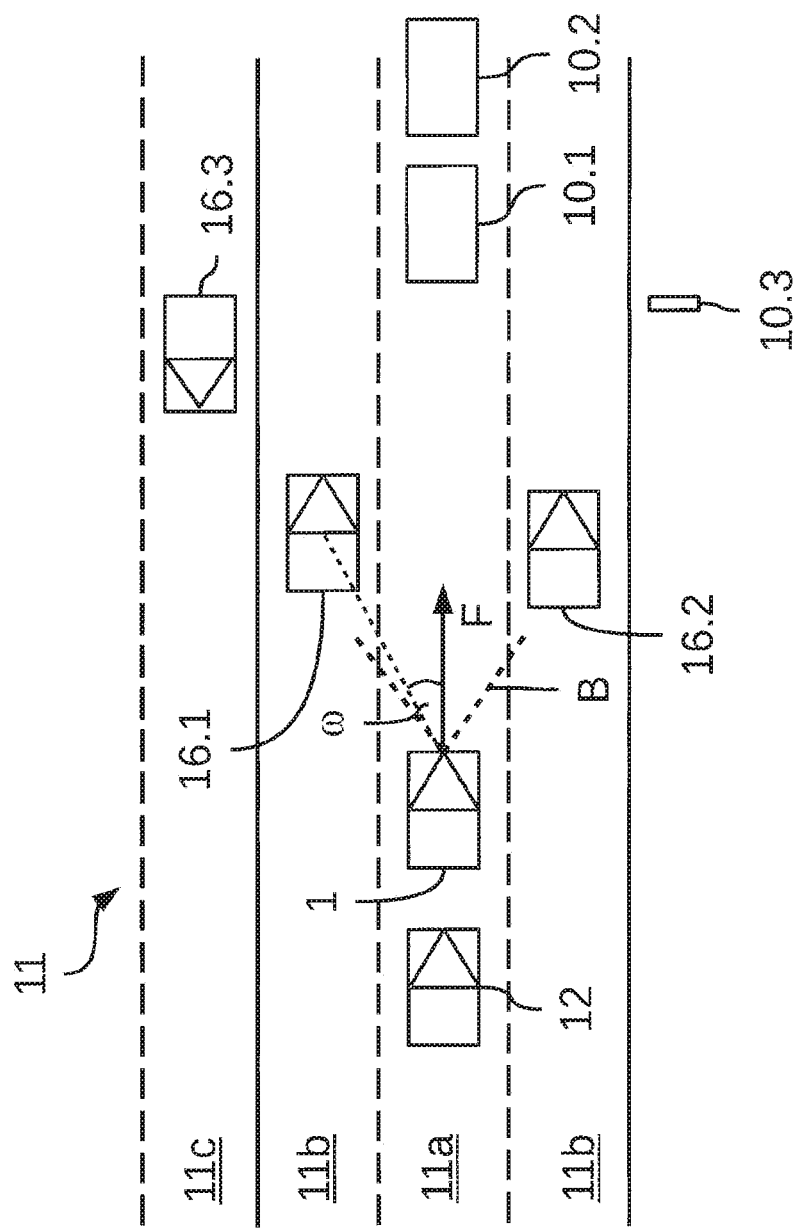
FIG. 2 shows a driving situation of the utility vehicle according to FIG. 1.

The emergency braking control unit 7 takes both moving objects 16.1, 16.2, 16.3 (moving objects) and also stationary objects 10.1, 10.2, 10.3 (stationary objects), which are located in the travel direction F of the ego vehicle 1, into consideration during its evaluation of the probability of collision P. An exemplary driving situation having such objects 10.i, 16.i is shown in FIG. 2. Whether a moving object 16.i or a stationary object 10.i is present can be ascertained, for example, on the basis of the relative velocity vr.j of the ego vehicle 1 relative to the respective object 10.i, 16.i, wherein the relative velocity vr.j corresponds in the case of a stationary object 10.i to the negative of the ego vehicle velocity vFzg, i.e. vr.j=−vFzg.

In particular other vehicles 16.i, which also move on the roadway 11, i.e. on the same lane 11a, on one of the adjacent lanes 11b, or on an oncoming lane 11c, come into consideration as moving objects according to the driving situation in FIG. 2. Stationary vehicles 10.1, 10.2 on the roadway 11, in particular the ego roadway 11a, can be taken into consideration a stationary objects, or also objects 10.3, for example a traffic sign, adjacent to the roadway 11.

To be able to evaluate a probability of collision P with a stationary or a moving object 10.i, 16.i, in consideration of the "functional safety" according to the ISO norm ISO 26262, emergency braking parameters BK, BT, BD, WD, which specify a braking behavior of the ego vehicle 1 during an emergency braking situation, are incorporated, which are selected such that autonomous emergency braking performed using these emergency braking parameters BK, BT, BD, WD meets the ISO norm. Thus, according to the specification in the ISO norm, a risk of collision accidents and a hazard to the following traffic—for example a following vehicle 12—are to be minimized, in particular in case of a malfunction of the emergency braking system 6. The emergency braking parameters, by which this is to be achieved, are in this case in particular a brake strength or a brake force BK, a braking time BT, and a braking duration BD, which are set in the braking system 2 during autonomously performed braking, and/or a warning duration WD for the warning device 15 to the driver shortly before imminent emergency braking.

If an emergency braking situation is detected on the basis of the probability of collision P, the emergency braking control unit 7 outputs a corresponding emergency braking signal S1 to the braking system 2, and therefore the vehicle 1 is braked in the context of the emergency braking using the emergency braking parameters BK, BT, BD, which comply with the ISO norm.

During such emergency braking, a driving dynamics parameter zMFDD, dvFzg, which characterizes a development of the vehicle velocity vFzg during emergency braking and therefore a real reaction of the vehicle 1 to the emergency braking, is furthermore monitored. The driving dynamics parameter relates according to a first embodiment to the mean vehicle full deceleration zMFDD (mean fully developed deceleration, MFDD) according to the guidelines of the ECE R13 Annex 4, wherein the mean vehicle full deceleration zMFDD specifies a mean value of a vehicle actual deceleration zIst in relation to a covered distance s or a time t which has passed, respectively.

The mean vehicle full deceleration zMFDD is defined in this case according to ECE R13, Annex 4 as $$zMDFF = (va^2 - vb^2)/(25.92 \cdot (sa - sb)) \tag{F1}$$

wherein va specifies a first velocity deviation, which corresponds to $0.8 \cdot v0$, wherein v0 is a starting velocity, which is present at the beginning of the emergency braking, vb specifies a second velocity deviation, which corresponds to $0.1 \cdot v0$, and sa and sb specify the distances covered at the respective velocity deviations va, vb in meters.

Alternatively, the mean vehicle full velocity zMFDD can be computed in relation to the time t as $$zMDFF = (vb - va)/(tb - ta) \tag{F2}$$

wherein ta and tb specify the times at which the respective velocity deviations va, vb are present.

It is taken into consideration via the two velocity deviations va, vb that at the beginning of emergency braking, i.e. up to 80% of the starting velocity v0 is reached, and shortly before the end of the braking, i.e. at 10% of the starting velocity v0, dead times and threshold times are present, which corrupt the determination of the mean vehicle full deceleration zMFDD. These are therefore not taken into consideration in the computation.

For the continuous determination of the mean vehicle full deceleration zMDFF during travel, at the beginning of braking, firstly the starting velocity v0 is ascertained and from a present vehicle velocity of $Fzg=0.8 \cdot v0$, the following relationship is computed:

$$zMDFF = (vFzg - va)/(tFzg - ta) \tag{F3}$$

wherein vFzg specifies the presently existing vehicle velocity and tFzg specifies a present time from the beginning of braking, va and ta specify the first velocity deviation and the first point in time at which the first velocity deviation va is present, respectively. This calculation takes place until the vehicle velocity vFzg corresponds to the second velocity deviation, i.e. until the present vehicle velocity vFzg has fallen to 10% of the starting velocity v0. From then on, the mean vehicle full deceleration zMFDD is kept at the present value, so as not to corrupt the value at low vehicle velocities vFzg.

For adaptive control during autonomous emergency braking, the mean vehicle full deceleration zMFDD is continuously determined according to above formula F3 in the event of a request for a certain vehicle setpoint deceleration zSoll in the context of the emergency braking, for example in the braking control unit 3 or the emergency braking control unit 7. If it is determined that the mean vehicle full deceleration zMDFF exceeds a previously defined full deceleration limiting value zo (driving dynamics limiting value), the vehicle setpoint deceleration zSoll is reduced accordingly.

The full deceleration limiting value zo is prescribed in this case in particular by the ISO norm ISO 26262, which requires a risk analysis and a hazard estimation, to which the full deceleration limiting value zo is to be adapted, such that the risks and hazards for the following vehicle 12 can be minimized in the event of a collision accident. Furthermore, a setpoint deceleration limiting value zl is legally prescribed, which specifies that the vehicle setpoint deceleration zSoll cannot drop below 4 m/s$^2$ in an emergency braking situation.

Accordingly, according to this exemplary embodiment, a full deceleration limiting value zo of for example 7.5 m/s$^2$, which is dependent on the braking performance of the braking system 2 and complies with the ISO norm, is specified as the driving dynamics limiting value for the mean vehicle full deceleration zMFDD and in addition a legally defined setpoint deceleration limiting value zl of 4 m/s$^2$ is prescribed for the vehicle setpoint deceleration zSoll. If emergency braking is initiated, the control of the vehicle setpoint deceleration zSoll takes place in dependence on these limiting values zo, zl.

Figure 3:
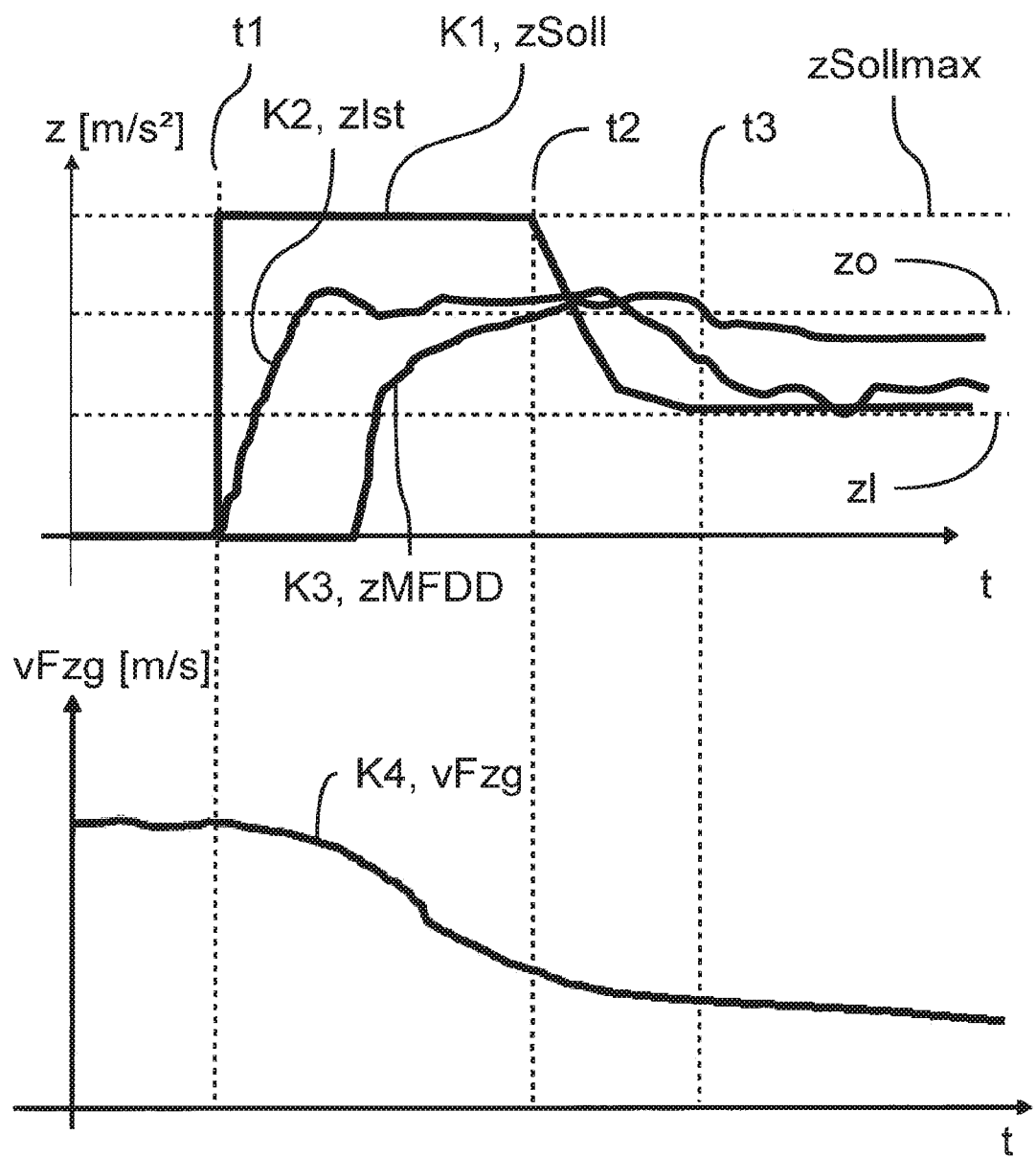
FIGS. 3, 4, and 5 show exemplary courses of driving dynamics parameters during emergency braking.
Figure 4:
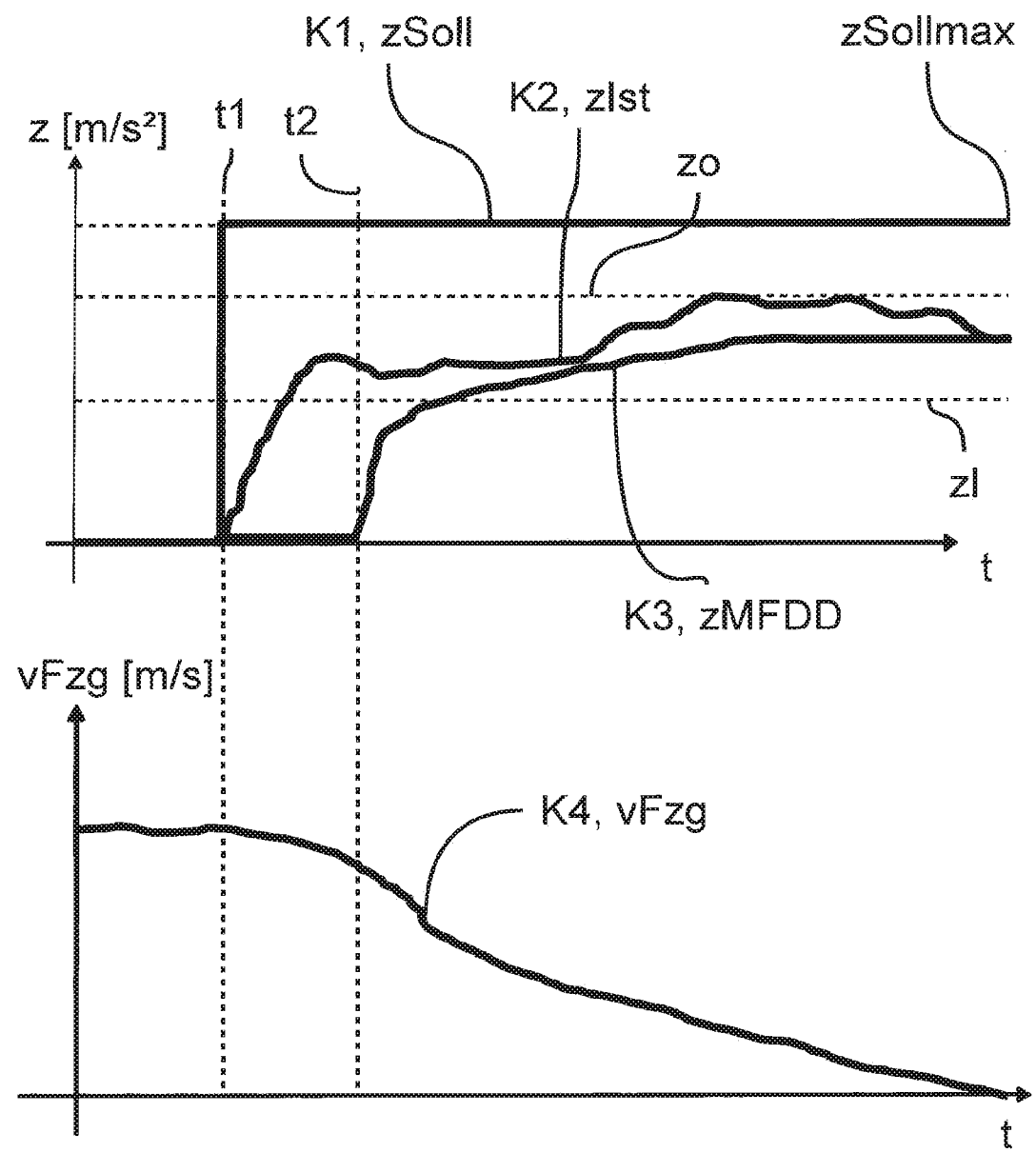

Two autonomously performed emergency braking actions are shown by way of example in FIGS. 3 and 4, wherein the course of the vehicle setpoint deceleration zSoll is shown in a first curve K1, the course of the vehicle actual deceleration zIst is shown in a second curve K2, and the course of the mean vehicle full deceleration zMDFF is shown in a third curve K3. The fourth curve K4 shows the development of the vehicle velocity vFzg.

At the beginning of autonomous emergency braking, firstly a maximum vehicle setpoint deceleration zSollmax of for example 10 m/s$^2$ is requested at a first braking time t1, wherein this can also be lower in dependence on the braking performance of the vehicle 1. At least at the beginning of emergency braking, a maximum reaction is thus immediately performed, and therefore the braking distance for the ego vehicle 1 can be minimized. As a result of this, a vehicle actual deceleration zIst rises strongly at the beginning of braking.

If it is defined during the autonomous emergency braking using the maximum vehicle setpoint deceleration zSollmax that the full deceleration limiting value zo has been exceeded by the vehicle full deceleration zMFDD (see K3) or exceeding is imminent, which is the case according to FIG. 3 approximately at a second braking time t2, the vehicle setpoint deceleration zSoll is reduced from this time down to the setpoint deceleration limiting value zl=4 m/s$^2$, and therefore as a reaction thereto, a short time later the vehicle actual deceleration zIst and thus also the mean vehicle full deceleration zMDFF also drop. The change of the vehicle velocity vFzg is accordingly also less, since braking is performed less strongly. The reaction of the braking system 2 to the change of the vehicle setpoint deceleration zSoll can occur in this case with a slight time delay as shown in FIG. 3, since the braking system 2 does not react immediately to the change. At a third braking time t3, the mean vehicle full deceleration zMDFF falls below the full deceleration limiting value zo again, and therefore the vehicle setpoint deceleration zSoll can be maintained.

So as not to obtain pulsing, abrupt, or overshooting behavior of the braking system 2, which the driver will perceive as unpleasant, a soft control takes place such that an adaptation of the vehicle setpoint deceleration zSoll already takes place when exceeding the full deceleration limiting value zo threatens, wherein the adaptation takes place slowly via a ramp, i.e. without an abrupt reduction of the vehicle setpoint deceleration (see FIG. 3). This can be ascertained, for example, on the basis of a predicted course of the vehicle full deceleration zMFDD by possible exceeding of the full deceleration limiting value zo being estimated in dependence on the present course and an appropriate reaction being taken by an adaptation of the vehicle setpoint deceleration zSoll. A control can be carried out here, for example, like a PID controller (proportional-integral-derivative).

According to the braking situation in FIG. 4, adaptive adaptation of the vehicle setpoint deceleration zSoll does not take place, since the limiting values zo, zl are complied with after the beginning of braking, i.e. for t>t1.

Alternatively or in parallel to the adaptive control of the vehicle setpoint deceleration zSoll in dependence on the mean vehicle full deceleration zMFDD as a driving dynamics parameter, an adaptation of the braking behavior can also take place during the emergency braking in dependence on a vehicle velocity change dvFzg as a driving dynamics parameter. A change limiting value dvFzgmax as a driving dynamics limiting value takes into consideration in this case by which amount the vehicle velocity vFzg can drop at most during performed emergency braking in order to keep the prescribed risk and the hazard to the following traffic low, for example according to ISO 26262. If the change limiting value dvFzgmax is reached, the vehicle setpoint deceleration zSoll is controlled to zero, i.e. the emergency braking is terminated to correspond to the legal requirements.

Figure 5:
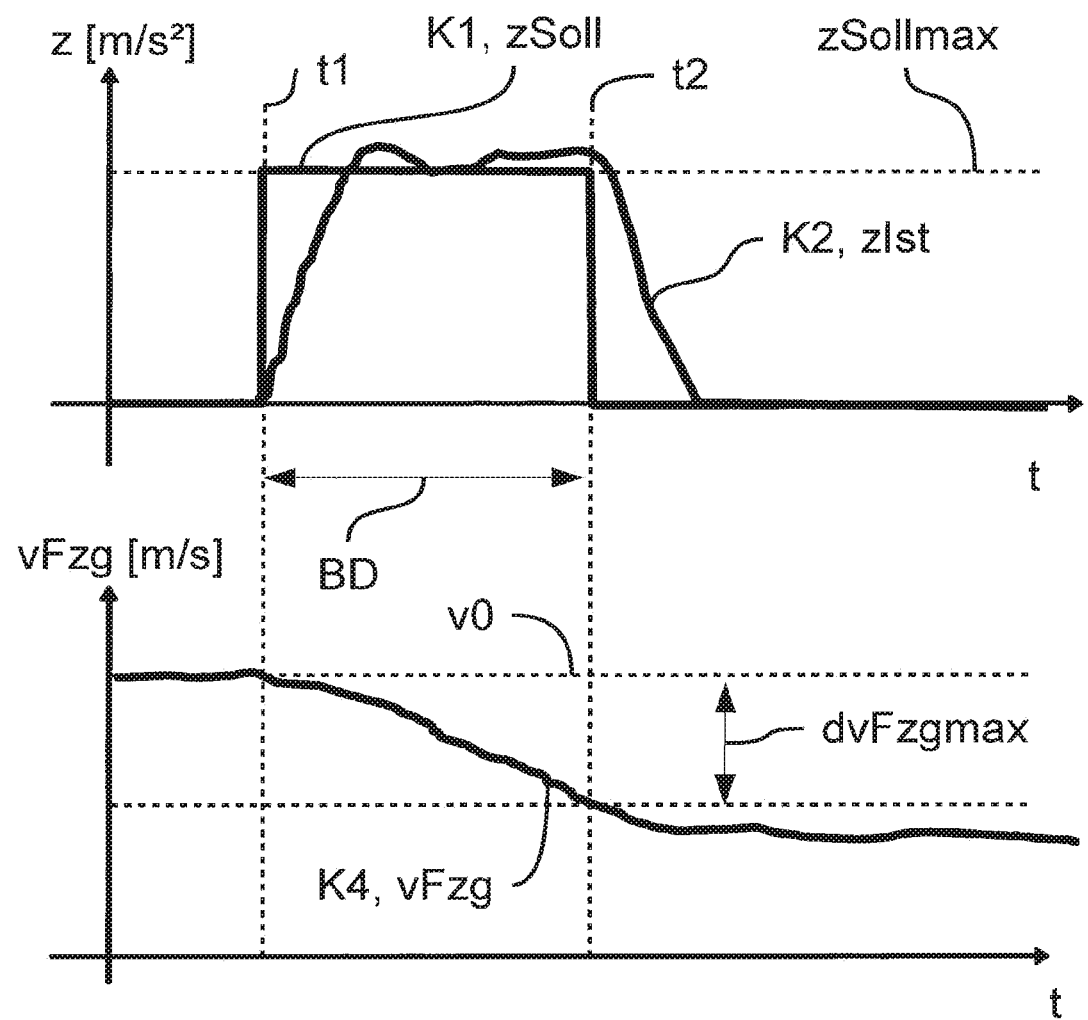

For this purpose, according to FIG. 5, at the beginning of braking at the first braking time t1, the starting velocity v0 is determined and subsequently after request for the maximum vehicle setpoint deceleration zSollmax, the present vehicle velocity vFzg is measured continuously. As soon as the vehicle velocity vFzg has fallen by the change limiting value dvFzgmax—20 km/h here—the vehicle setpoint deceleration zSoll is set to zero after the braking duration BD in order to correspond to ISO 26262 and not endanger the following vehicle 12. The braking duration BD is different in this case in dependence on the design of the braking system 2.

In the case of a combination of both embodiments, i.e. if control is performed both to the vehicle full deceleration zMFDD and also to the vehicle velocity change dvFzg, the adaptation of the vehicle setpoint deceleration zSoll takes place correspondingly. Accordingly, if the change limiting value dvFzgmax is not yet reached, control is performed within the limiting values zl, zo. Upon reaching the change limiting value dvFzgmax, the emergency braking is terminated and maintaining the above-mentioned limiting values zl, zo is no longer provided.

Figure 6:
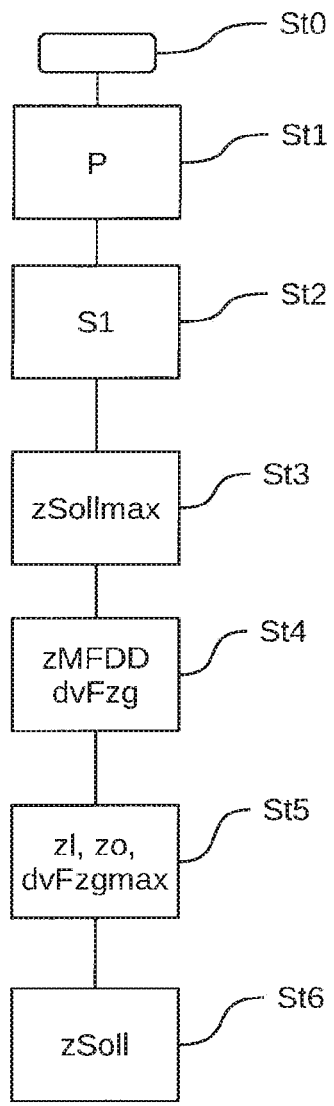
FIG. 6 shows a flow chart of a method according to an embodiment of the invention.

A method according to an embodiment of the invention can take place as follows according to FIG. 6, for example: In an initial step St0, the emergency braking system 6 is initialized, for example with the starting of the vehicle 1. In a following first step St1, the surroundings U in front of the vehicle 1 is monitored for objects 10.$i$, 16.$i$ lying ahead by the emergency braking system 6, in order to evaluate whether an emergency braking situation is present, by the probability of collision P with the objects 10.$i$, 16.$i$ lying ahead being ascertained. If an emergency braking situation was detected, i.e. an unavoidable collision with a vehicle 10.1, 10.2 traveling ahead is imminent, in a second step St2, an emergency braking signal S1 is output by the emergency braking system 6, in dependence on which emergency braking is performed autonomously by the braking system 2, wherein the braking system 2 is activated for this purpose in a third step St3 with a maximum vehicle setpoint deceleration zSollmax for the corresponding braking system 2.

In a fourth step St4, the driving dynamics parameters zMFDD, dvFzg are monitored, i.e. on the basis of the vehicle velocity vFzg measured in the vehicle 1, according to formula F3, the mean vehicle full deceleration zMFDD is determined and/or a vehicle velocity change dvFzg is ascertained from the beginning of braking, i.e. from the first braking time t1.

In a fifth step St5, it is ascertained whether the driving dynamics parameter zMFDD, dvFzg complies with the respective driving dynamics limiting value, i.e. the full deceleration limiting value zo and/or the change limiting value dvFzgmax. In case of compliance, the vehicle setpoint deceleration zSoll is maintained, i.e. nothing is performed. In case of noncompliance with the driving dynamics limiting values zo, dvFzgmax, in a sixth step St6, the vehicle setpoint deceleration zSoll is adapted in consideration of the setpoint deceleration limiting value zl, in particular lowered, such that the driving dynamics limiting values zo, dvFzgmax are complied with again.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 vehicle
2 braking system
3 braking control unit
4 service brakes
5 wheels
6 emergency braking system
7 emergency braking control unit
8 surroundings monitoring system
8.1 sensor, radar sensor, LIDAR sensor
9 electromagnetic radiation
9$a$ reflected electromagnetic radiation
10.$i$ stationary vehicles on the roadway (stationary object)

11 roadway
11a ego lane
11b adjacent lane
11c oncoming lane
12 following vehicle
15 warning device
16.i moving objects (moving object)
A spacing
B angle range
BD braking duration
BK brake force
BT braking time
dvFzg vehicle velocity change
dvFzgmax change limiting value (driving dynamics limiting value)
F travel direction
K1 first curve (vehicle setpoint deceleration)
K2 second curve (vehicle actual deceleration)
K3 third curve (mean vehicle full deceleration)
K4 fourth curve (vehicle velocity)
P probability of collision
s distance
sa first covered distance
sb second covered distance
S1 emergency braking signals
S2 sensor signals
S3 warning signal
t time
t1 first braking time
t2 second braking time
t3 third braking time
ta first time
tb second time
tFzg present time from beginning of braking
U surroundings
v0 starting velocity
va first velocity deviation
vb second velocity deviation
vFzg vehicle velocity
vO.i object velocity
vr relative velocity
w angle
WD warning duration
zo full deceleration limiting value (driving dynamics limiting value)
zSoll vehicle setpoint deceleration
zSollmax maximum vehicle setpoint deceleration
zIst vehicle actual deceleration
zl setpoint deceleration limiting value
F1, F2, F3 formulas
St1, St2, steps of the method
St3, St4,
St5, St6

The invention claimed is:

1. A method for performing emergency braking in a vehicle, the method comprising:
registering at least one object in surroundings of the vehicle and ascertaining a probability of collision for the vehicle with the at least one registered object to detect an emergency braking situation;
in response to detecting the emergency braking situation, autonomously activating service brakes of the vehicle using a vehicle setpoint deceleration to perform emergency braking; and
adapting, based on a driving dynamics parameter, the vehicle setpoint deceleration during the autonomously performed emergency braking,
wherein the driving dynamics parameter characterizes a real reaction of the vehicle to the performed emergency braking,
wherein the driving dynamics parameter is ascertained during the emergency braking,
wherein the driving dynamics parameter is a mean vehicle full deceleration defined as a mean value of an actual vehicle deceleration observed over a distance covered during the emergency braking,
wherein adapting the vehicle setpoint deceleration is performed in response to determining that the driving dynamics parameter does not comply with a driving dynamics limiting value or is predicted to not comply with the driving dynamics limiting value, and
wherein adapting the vehicle setpoint deceleration is performed smoothly by ramping down the vehicle setpoint deceleration without abrupt change of the vehicle setpoint deceleration to a setpoint deceleration limiting value.

2. The method as claimed in claim 1, wherein a full deceleration limiting value is defined for the mean vehicle full deceleration as the driving dynamics limiting value, wherein the vehicle setpoint deceleration is adapted responsive to determining that the mean vehicle full deceleration exceeds the full deceleration limiting value.

3. The method as claimed in claim 1, wherein the driving dynamics parameter is continually monitored during the emergency braking.

4. The method as claimed in claim 1, further comprising computing the mean vehicle full deceleration based on multiple measurements of actual vehicle deceleration.

5. The method as claimed in claim 1, further comprising averaging multiple measurements of actual vehicle deceleration over a period of time or over a period of distance to compute the mean vehicle full deceleration.

6. A method for performing emergency braking in a vehicle, the method comprising:
registering at least one object in surroundings of the vehicle and ascertaining a probability of collision for the vehicle with the at least one registered object to detect an emergency braking situation;
in response to detecting the emergency braking situation, autonomously activating service brakes of the vehicle using a vehicle setpoint deceleration to perform emergency braking; and
adapting, based on a driving dynamics parameter, the vehicle setpoint deceleration during the autonomously performed emergency braking,
wherein the driving dynamics parameter characterizes a real reaction of the vehicle to the performed emergency braking,
wherein the driving dynamics parameter is ascertained during the emergency braking,
wherein the driving dynamics parameter is a vehicle velocity change that specifies a change of a vehicle velocity from a first braking time at a beginning of the emergency braking,
wherein adapting the vehicle setpoint deceleration is performed in response to determining that the driving dynamics parameter does not comply with a driving dynamics limiting value or is predicted to not comply with the driving dynamics limiting value, and
wherein adapting the vehicle setpoint deceleration is performed smoothly by ramping down the vehicle setpoint deceleration without abrupt change of the vehicle setpoint deceleration to a setpoint deceleration limiting value.

7. The method as claimed in claim 6, wherein a change limiting value is defined for the vehicle velocity change as the driving dynamics limiting value, and wherein the adapting the vehicle setpoint deceleration during the autonomously performed emergency braking is performed in response to the vehicle velocity change being greater than the change limiting value.

8. The method as claimed in claim 1, wherein, upon the adaptation of the vehicle setpoint deceleration during the emergency braking, a setpoint deceleration limiting value is furthermore defined, wherein the vehicle setpoint deceleration is kept during the emergency braking to a value greater than the setpoint deceleration limiting value.

9. The method as claimed in claim 1, wherein, at a first braking time at the beginning of the emergency braking, a maximum vehicle setpoint deceleration is set.

10. A method for performing emergency braking in a vehicle, the method comprising:

registering at least one object in surroundings of the vehicle and ascertaining a probability of collision for the vehicle with the at least one registered object to detect an emergency braking situation;

in response to detecting the emergency braking situation, autonomously activating service brakes of the vehicle using a vehicle setpoint deceleration to perform emergency braking; and in response to autonomously activating the service brakes of the vehicle using the vehicle setpoint deceleration to perform emergency braking, performing a vehicle setpoint deceleration adaptation procedure comprising:

continuously ascertaining, during the emergency braking, a driving dynamics parameter, wherein the driving dynamics parameter is a vehicle velocity change that specifies a change of a vehicle velocity from a first braking time to a second braking time, wherein the first braking time corresponds to a start of the emergency braking, determining that the driving dynamics parameter does not comply with a driving dynamics limiting value or is predicted to not comply with the driving dynamics limiting value, and adapting, during the autonomously performed emergency braking and in response to the determining that the driving dynamics parameter does not comply with the driving dynamics limiting value, the vehicle setpoint deceleration, wherein adapting the vehicle setpoint deceleration is performed smoothly by ramping down the vehicle setpoint deceleration without abrupt change of the vehicle setpoint deceleration to a setpoint deceleration limiting value.

11. The method as claimed in claim 10, wherein the driving dynamics limiting value is a change limiting value, wherein the determining that the driving dynamics parameter does not comply with the driving dynamics limiting value comprises determining that the vehicle velocity change has exceeded the change limiting value, and wherein the adapting, during the autonomously performed emergency braking and in response to the determining that the driving dynamics parameter does not comply with the driving dynamics limiting value, the vehicle setpoint deceleration comprises setting the vehicle setpoint deceleration to zero.

12. The method as claimed in claim 10, wherein the first braking time is a time at which the autonomously activating service brakes of the vehicle is performed and the second braking time is a subsequent time during the emergency braking.

13. The method as claimed in claim 10, further comprising computing the vehicle velocity change by:

determining a current actual vehicle velocity, determining a previous actual vehicle velocity, and computing an amount of time elapsed, or a distance covered, between (i) the determined current actual vehicle velocity and (ii) the determined previous actual vehicle velocity occurred.

14. The method as claimed in claim 13, further comprising computing an updated vehicle velocity change by:

determining a subsequent current actual vehicle velocity, and computing an amount of time elapsed between the determined subsequent current actual vehicle velocity and the same determined previous actual vehicle velocity.

* * * * *